US010072529B2

(12) United States Patent
Yamada

(10) Patent No.: US 10,072,529 B2
(45) Date of Patent: Sep. 11, 2018

(54) TURNING DEVICE AND ROTARY MACHINE

(71) Applicant: MITSUBISHI HEAVY INDUSTRIES COMPRESSOR CORPORATION, Tokyo (JP)

(72) Inventor: Masataka Yamada, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 335 days.

(21) Appl. No.: 14/894,293

(22) PCT Filed: Jan. 28, 2014

(86) PCT No.: PCT/JP2014/051756
§ 371 (c)(1),
(2) Date: Nov. 25, 2015

(87) PCT Pub. No.: WO2015/114730
PCT Pub. Date: Aug. 6, 2015

(65) Prior Publication Data
US 2016/0108760 A1 Apr. 21, 2016

(51) Int. Cl.
F01D 15/08 (2006.01)
F01D 25/34 (2006.01)
F01D 21/00 (2006.01)
F16H 1/20 (2006.01)
F16H 35/18 (2006.01)
F16H 59/02 (2006.01)
F16H 3/34 (2006.01)

(52) U.S. Cl.
CPC ............ F01D 25/34 (2013.01); F01D 15/08 (2013.01); F01D 21/00 (2013.01); F16H 1/20 (2013.01);
(Continued)

(58) Field of Classification Search
CPC . F01D 25/34; F01D 15/08; F16H 1/20; F16H 35/18; F16H 59/02
See application file for complete search history.

(56) References Cited

U.S. PATENT DOCUMENTS 2,747,423 A * 5/1956 Sanders .................. B43L 13/06
74/396
2,949,730 A 8/1960 Kenney et al.
(Continued)

FOREIGN PATENT DOCUMENTS

CN 101718227 A 6/2010
EP 2161416 A2 3/2010
(Continued)

OTHER PUBLICATIONS

Chinese Office Action and Search Report for Chinese Application No. 201480028846.4, dated Apr. 25, 2016, with English Translation.
(Continued)

Primary Examiner — David M Fenstermacher
(74) Attorney, Agent, or Firm — Birch, Stewart, Kolasch & Birch, LLP

(57) ABSTRACT

A turning device is provided with: a casing; a drive motor provided above the casing; a drive wheel rotated by the drive motor, the drive wheel being supported on one side of a reference plane located on the drive axis of the drive motor and parallel to the vertical direction, the drive wheel being rotatable about a reference line intersecting the reference plane; a driven wheel disposed within the casing, the driven wheel being supported so as to be rotatable about an axis parallel to the reference line, the driven wheel being connected to the drive wheel through an annular member; a first gear wheel coaxially connected to the driven wheel and having a first spur gear; a second gear wheel having a second spur gear meshing with a wheel gear which is provided coaxially with a rotating shaft extending parallel to the reference line, the second spur gear also meshing with the first spur gear of the first gear wheel; an arm member for rotatably supporting the second gear wheel; a movement mechanism for moving the arm member to thereby move the
(Continued)

second gear wheel between a meshed position at which the second gear wheel is meshed with the wheel gear and a retracted position at which the second gear wheel is not meshed with the wheel gear; and a cover adapted to mountable and removable from the casing and covering the drive wheel.

2 Claims, 4 Drawing Sheets

(52) U.S. Cl.
CPC ............. *F16H 35/18* (2013.01); *F16H 59/02* (2013.01); *F05D 2220/31* (2013.01); *F16H 3/34* (2013.01)

(56) References Cited

U.S. PATENT DOCUMENTS

| | | | | |
|---|---|---|---|---|
| 3,919,894 | A | * 11/1975 | Keeter | F01D 25/36 60/788 |
| 4,433,589 | A | * 2/1984 | Chaconas | B23D 55/06 74/325 |
| 7,731,172 | B2 | * 6/2010 | Yano | G03G 15/6529 271/10.09 |
| 8,683,886 | B2 | * 4/2014 | Hsu | F16H 21/44 74/396 |

FOREIGN PATENT DOCUMENTS

| | | |
|---|---|---|
| JP | 56-14809 A | 2/1981 |
| JP | 3-70802 A | 3/1991 |
| JP | 4-54360 A | 2/1992 |
| JP | 2000-246082 A | 9/2000 |
| JP | 2003-293706 A | 10/2003 |
| JP | 2012-177328 A | 9/2012 |
| JP | 2012-241536 A | 10/2012 |
| JP | 2013-170496 A | 9/2013 |
| WO | WO 2013/124979 A1 | 8/2013 |

OTHER PUBLICATIONS

Extended European Search Report, dated Mar. 24, 2016, for European Application No. 14881100.3.

* cited by examiner

TURNING DEVICE AND ROTARY MACHINE

TECHNICAL FIELD

The present invention relates to a turning device which rotates a rotor such as a turbine at a low speed, and a rotary machine including the turning device.

BACKGROUND ART

Hitherto, in a power generation plant which uses a steam turbine, a gas turbine, or a combined cycle including the steam turbine and the gas turbine, it is known that when a rotor (rotary shaft) is left while not being rotated at a high temperature during a period of time when operation is stopped, the following phenomenon occurs. That is, as the temperature of steam or gas decreases, a temperature gradient occurs in a turbine casing in a vertical direction, and thus bending occurs in the rotor due to thermal expansion, or a small degree of bending occurs during a period of time when the turbine is stopped due to the rotor's own weight.

Therefore, during a period of time when the operation of the turbine is stopped or before starting-up, so-called turning, in which the rotor is rotated at a low speed for a predetermined time is performed to prevent the occurrence of bending in the rotor.

For example, a turning device described in PTL 1 includes a driving motor. The shaft of the driving motor is connected to a deceleration mechanism which decelerates the rotation of the shaft. The deceleration mechanism is provided with a driving pulley (driving wheel) and is configured to transmit the rotation of the decelerated driving motor to the driving pulley.

On the lower side of the deceleration mechanism, a driven pulley (driven wheel) having the same axial direction as that of the driving pulley is disposed. A V-belt (annular member) is looped over the driving pulley and the driven pulley.

A first spur gear which rotates coaxially with the driving pulley is integrally attached to the driving pulley. On the lower side of the first spur gear, a second spur gear having the same axial direction as that of the first spur gear is disposed. The first spur gear and the second spur gear always engage with each other.

A pair of arm members are supported by the rotary shaft of the second spur gear so as to be inclined while interposing the second spur gear therebetween in the axial direction thereof. A pinion gear (second toothed wheel) having the same axial direction as those of the second spur gear and a wheel gear is rotatably pivoted by one end portion of the arm member. The pinion gear is displaceable by the inclination of the arm member between an engagement position where the pinion gear approaches and engages with the wheel gear and a retreat position where the pinion gear is separated from the wheel gear toward a radially outer side. The wheel gear is coaxially fixed to a rotor.

As described above, in the turning device described in PTL 1, gears which transmit the driving force to the wheel gear on the downstream side from the driven pulley have a three-stage configuration including the first spur gear, the second spur gear, and the pinion gear.

In general, one end portion of the rotor is connected to a compressor, and the other end portion of the rotor is connected to a turbine. The connection portion of the rotor and the compressor is covered with a coupling guard for avoiding oil or the like.

The driving pulley and the driven pulley are covered with a chain cover (cover), and the chain cover is detachably attached to the compressor side of the turning device.

In the turning device configured as described above, the position of the pinion gear is the retreat position during an operation of a steam turbine.

When the operation of the steam turbine is stopped, the arm member is inclined by a control unit of the turning device such that the pinion gear is displaced from the retreat position toward the wheel gear to the engagement position. When the driving motor is driven, the rotation power of the driving motor is transmitted to the wheel gear via the deceleration mechanism, the driving and driven pulleys, the V-belt, the first spur gear, the second spur gear, and the pinion gear. In addition, the rotor is rotated along with the wheel gear. At this time, the rotor is rotated at a lower speed than when the steam turbine is operated.

CITATION LIST

Patent Literature

[PTL 1] International Publication No. WO 2013/124979

SUMMARY OF INVENTION

Technical Problem

However, in the turning device described in PTL 1, when the coupling guard is attached and detached, there is concern that the coupling guard may interfere with the chain cover, and thus the gears are allowed to have the three-stage configuration. However, this causes a vertically long structure, resulting in a reduction in stiffness and an increase in the number of components. When the coupling guard interferes with the chain cover, operability during the attachment and detachment of the coupling guard is degraded.

The present invention has been made taking the foregoing problems into consideration, and an object thereof is to provide a turning device which prevents a coupling guard from interfering with a cover when the coupling guard is attached and detached, and reduces the number of stages of gears, and a rotary machine including the turning device.

Solution to Problem

In order to solve the problems, the invention proposes the following means.

According to an aspect of the present invention, a turning device includes: a casing; a driving motor which is attached to be positioned higher than the casing; a driving wheel which is disposed above the casing, is supported on one side with respect to a reference plane that is parallel to a vertical direction on a driving shaft of the driving motor and, to be rotatable around a reference line that intersects the reference plane, and is rotated by the driving motor; a driven wheel which is disposed in the casing, is supported to be rotatable around an axis that is parallel to the reference line, and is connected to the driving wheel via an annular member; a first toothed wheel which is coaxially connected to the driven wheel and has first spur teeth; a second toothed wheel having second spur teeth that engage with each of a wheel gear that is provided coaxially with a rotary shaft which extends parallel to the reference line, and the first spur teeth of the first toothed wheel; an arm member which rotatably supports the second toothed wheel; a moving mechanism which moves the second toothed wheel between an engagement position where the second toothed wheel engages with the wheel gear and a retreat position where the second toothed wheel does not engage with the wheel gear, by moving the arm member; and a cover which is attachable to and detachable from the casing and covers the driving wheel, in which a compressor is connected to the rotary shaft on the other side with respect to the reference plane.

In addition, it is preferable that the turning device further includes a rotating lever of which one end portion is coaxially connected to the driving wheel via a ratchet mechanism, in which the ratchet mechanism restricts rotation of one end portion of the rotating lever, with respect to an axis of the driving wheel, in one direction around the axis, while allowing the rotation thereof in the other direction around the axis, the moving mechanism includes a moving lever of which one end portion is rotatably supported by the casing, and a connection member which is connected to each of the moving lever and the arm member and is configured to move the arm member when the moving lever is rotated, and the rotating lever and the moving lever are rotated in a direction along the reference line on the same side with respect to the cover.

In addition, according to another aspect of the present invention, a rotary machine includes the turning device described above.

Advantageous Effects of Invention

According to the turning device and the rotary machine of the present invention, the number of components can be reduced by reducing the number of stages of gears, and a power transmission coefficient can be enhanced by increasing stiffness.

DESCRIPTION OF EMBODIMENTS (First Embodiment)

Hereinafter, a first embodiment of a rotary machine according to the present invention will be described with reference to FIGS. 1 to 4 by exemplifying a case where the rotary machine is a steam turbine.

Figure 1:
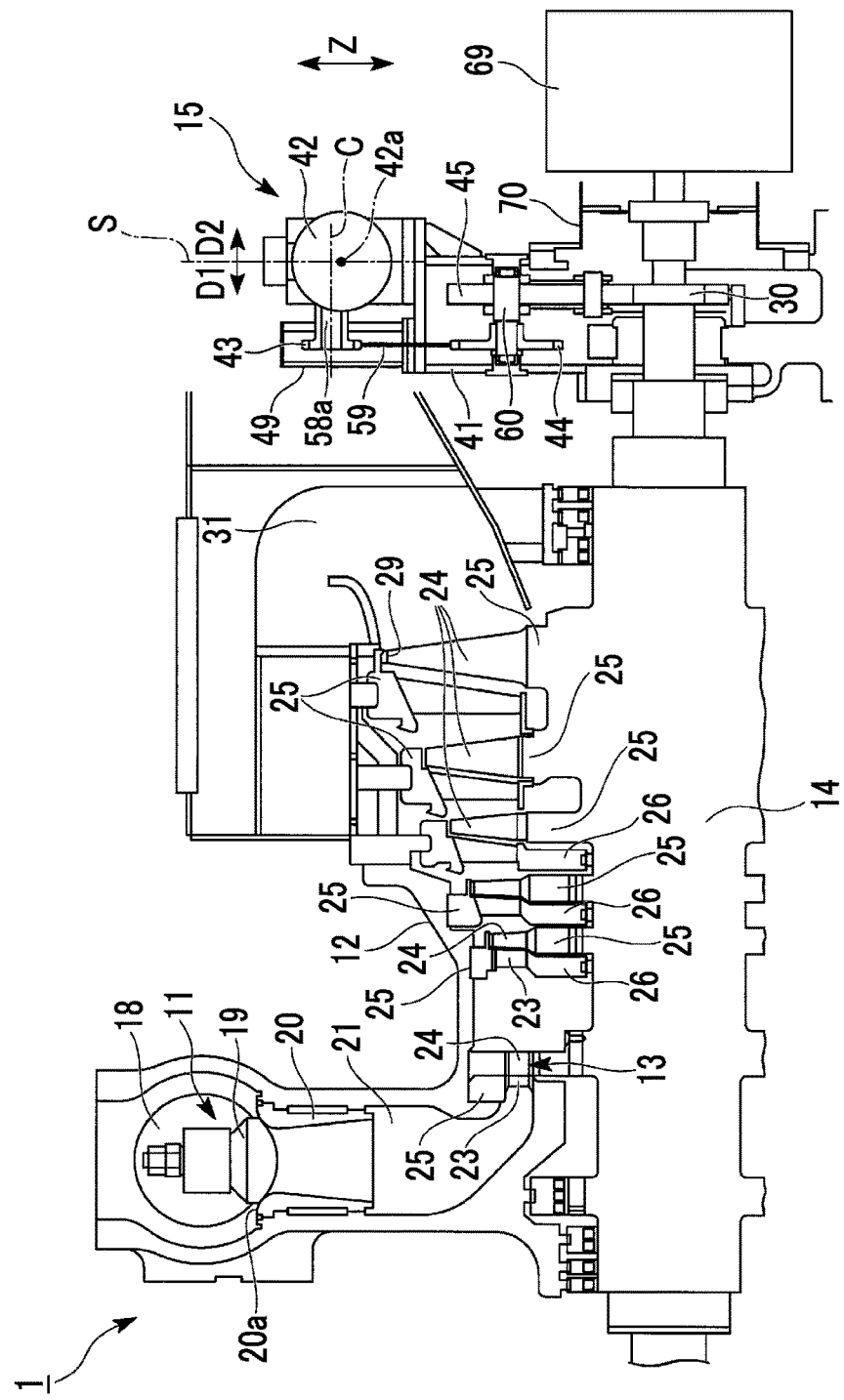
FIG. 1 is a sectional view illustrating the summary of the configuration of a steam turbine of a first embodiment of the present invention.

As illustrated in FIG. 1, a steam turbine 1 of this embodiment includes an adjusting valve 11 which adjusts the amount and pressure of steam (operating fluid) that flows into the steam turbine 1, a body side casing 12 which holds the pressure, a power generating part 13 which generates power, a rotor (rotary shaft) 14 which transmits the generated power to a machine such as a compressor 69, a bearing device (not illustrated) which rotatably supports the rotor 14 around an axis, and a turning device 15 of the present invention for rotating the rotor 14.

A plurality of the adjusting valves 11 (only a single adjusting valve 11 is illustrated in FIG. 1) are attached to the inside of the body side casing 12, and each thereof includes an adjusting valve chamber 18 into which steam flow from a boiler (not illustrated), a valve body 19, and a valve seat 20.

The valve seat 20 has a substantially cylindrical shape, and the axis thereof is perpendicular to the axis of the rotor 14. The inside diameter of the valve seat 20 gradually increases toward the rotor 14, and the tip end portion thereof communicates with a steam chamber 21. An inner surface 20a of the end portion of the valve seat 20 on the opposite side of the steam chamber 21 is formed in a curved shape which is convex toward the inside. The shape of the lower portion of the valve body 19 forms a portion of a sphere and is provided to come into contact with or be separated from the inner surface 20a of the valve seat 20. When the valve body 19 becomes separated from the valve seat 20, a steam flow passage is open, and when the valve body 19 comes into contact with the valve seat 20, the steam flow passage is closed.

The adjusting valve 11 controls the flow rate of steam by opening and closing the valve body 19. Furthermore, the output of the steam turbine is controlled by adjusting the opening and closing timings of the plurality of adjusting valves 11.

The steam chamber 21 guides the steam that is introduced from the adjusting valve 11 to the power generating part 13 and has a substantially doughnut shape. The steam flow passage of the steam chamber 21 is narrowed toward the inside and is deflected toward a direction parallel to the axis of the rotor 14.

The power generating part 13 includes nozzles 23 which are fixed to the body side casing 12, and rotor blades 24 which are attached to the rotor 14. A set of one of the nozzles 23 and one of the rotor blades 24 is referred to as a stage, and the steam turbine 1 of this embodiment includes six stages.

The nozzle 23 has a function of generating velocity energy by allowing the steam to expand in the steam flow passage, and producing momentum in a rotational direction of a shaft by changing the direction of a flow.

The rotor blade 24 has a function of converting the energy of the steam converted into the velocity energy by the nozzle 23, into the rotational energy of the rotor 14.

A number of the nozzles 23 are radially arranged, and are held by a ring-shaped partition plate outer race 25 that is firmly fixed to the body side casing 12, and a ring-shaped partition plate inner race 26. A seal structure which prevents steam leakage is formed between an end portion of the partition plate inner race 26 on the rotor 14 side, and the rotor 14. In a stage in which a high steam pressure is applied, a labyrinth structure is employed as the seal structure although not illustrated.

A number of the rotor blades 24 are radially arranged, and are firmly attached to the outer peripheral portion of a disk (reference numeral thereof is omitted) provided in a cylindrical shape protruding from the rotor 14. A shroud 29 is attached to the tip end of the rotor blade 24 in the final stage, and a fin (not illustrated) for preventing steam leakage is attached to a position on the partition plate outer race 25 side which faces the shroud 29.

The rotor 14 is formed in a bar shape, and is rotatably supported by the above-mentioned bearing device. A wheel gear 30 is fixed to the outer peripheral surface of the rotor 14 coaxially with the rotor 14.

The rotor 14 has a function of transmitting the power generated by the power generating part 13 to a machine such as the compressor 69. A seal structure (not illustrated) for preventing leakage of steam or the like is provided between the rotor 14 and the body side casing 12. Exhaust steam which allows the steam turbine 1 to operate and finishes its work is sent to a condenser (not illustrated) through an exhaust chamber 31.

The turning device 15 is used for continuously rotating the rotor 14 at a speed that is much lower than a speed when the steam turbine 1 is operated, during a period of time when the operation of the steam turbine 1 is stopped or during the starting-up thereof.

Figure 2:
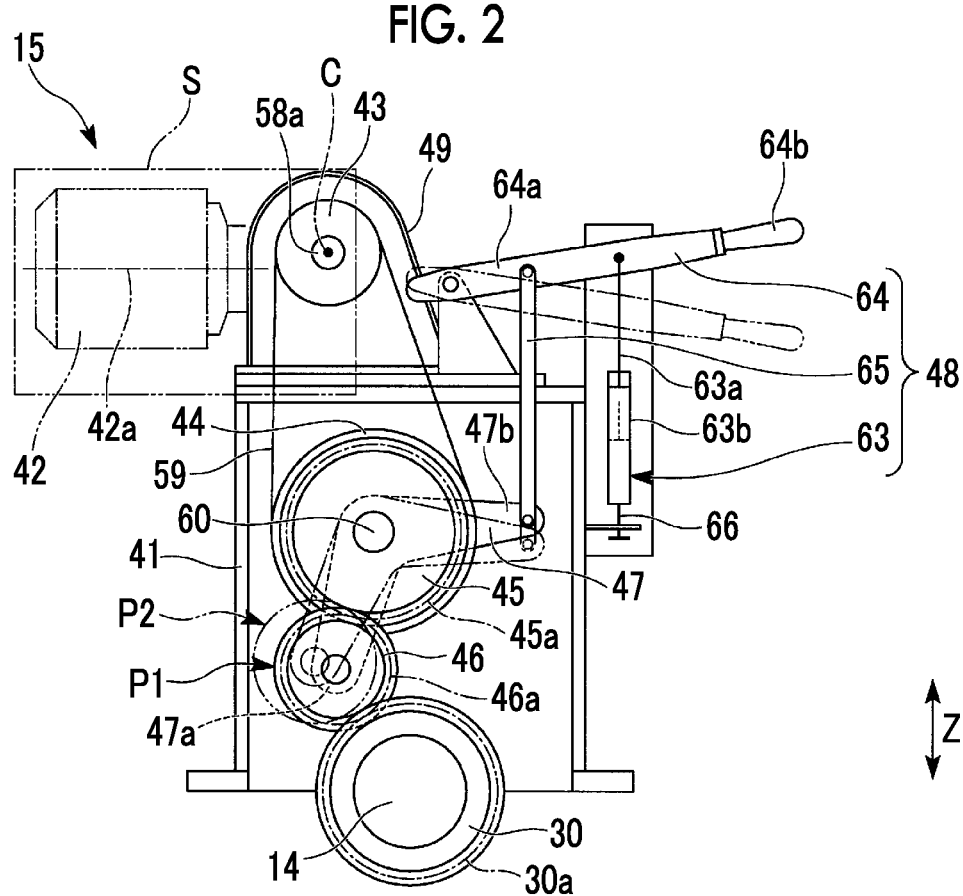
FIG. 2 is a sectional view of a side of a turning device of the steam turbine.
Figure 3:
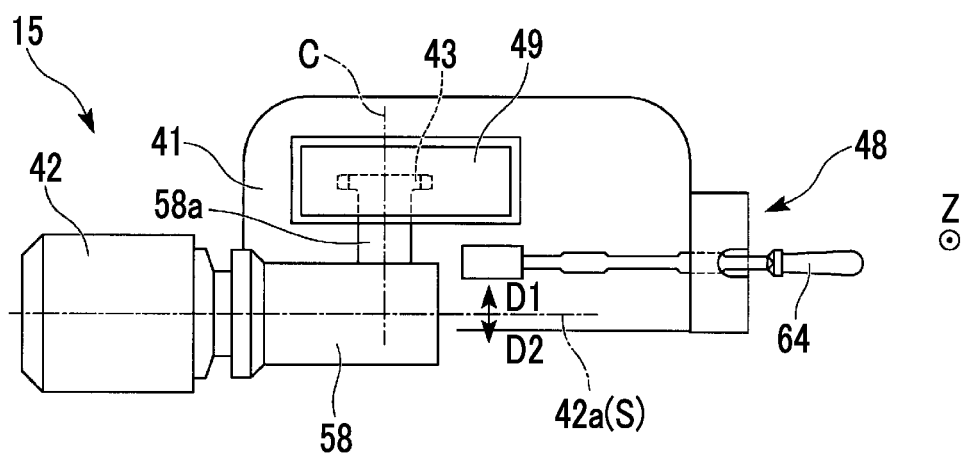
FIG. 3 is a plan view of the turning device.

As illustrated in FIGS. 1 to 3, the turning device 15 includes a casing 41, a driving motor 42 attached to the casing 41, a driving side sprocket (driving wheel) 43 which is specified on a driving shaft 42a of the driving motor 42 and is rotatably supported on one side D1 with respect to a reference plane S parallel to the vertical direction Z, a driven side sprocket (driven wheel) 44 which is rotatably supported in the casing 41, a toothed spur wheel (first toothed wheel) 45 which is coaxially connected to the driven side sprocket 44, a pinion gear (second toothed wheel) 46 which engages with both of the wheel gear 30 provided in the rotor 14 and the toothed spur wheel 45, an arm member 47 which rotatably supports the pinion gear 46, a moving mechanism 48 for moving the arm member 47, and a chain cover (cover) 49 which is attachable to and detachable from the casing 41.

Although the driving motor 42 is not illustrated in the section of FIG. 2, the driving motor 42 is illustrated by two-dot chain lines for convenience of description.

The casing 41 is formed by drilling a steel plate into a predetermined shape and performing bending, welding, and the like thereon.

The reference plane S is a plane which includes the driving shaft 42a of the driving motor 42 and is parallel to the vertical direction Z.

The driving motor 42 is attached at a higher position than that of the casing 41 so that the driving shaft 42a is parallel to a horizontal plane. The driving motor 42 may be attached to the casing 41 by well-known fastening means such as bolts and nuts, or screws (not illustrated).

Figure 4:
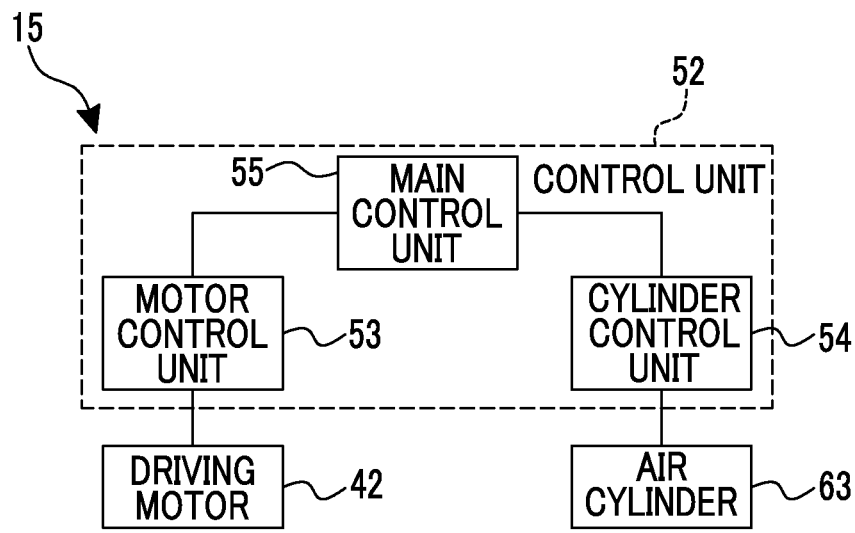
FIG. 4 is a block diagram of the turning device.

As illustrated in FIG. 4, the turning device 15 includes a control unit 52, and the driving motor 42 is driven by the control unit 52. More specifically, the control unit 52 includes a motor control unit 53 which controls the energization of the driving motor 42, a cylinder control unit 54, which will be described later, and a main control unit 55 which collectively controls the motor control unit 53 and the cylinder control unit 54.

As illustrated in FIGS. 1 to 3, the driving side sprocket 43 is attached to the casing 41 to be positioned higher than the casing 41. The driving side sprocket 43 is supported by the casing 41 to be rotatable around a reference line C that is perpendicular to the reference plane S. In addition, the above-mentioned rotor 14 extends parallel to the reference line C.

A deceleration mechanism 58 is provided between the driving motor 42 and the driving side sprocket 43. The rotation speed of the rotor shaft (not illustrated) which is rotated around the driving shaft 42a as the driving motor 42 is driven is decelerated by the deceleration mechanism 58, and the driving force is transmitted to the driving side sprocket 43 via a connection shaft 58a.

That is, the driving side sprocket 43 is rotated by the driving motor 42 via the deceleration mechanism 58.

The driven side sprocket 44 is disposed lower than the driving side sprocket 43 on the same plane as that of the driving side sprocket 43. The driven side sprocket 44 is supported by the casing 41 at a position separated from the driving side sprocket 43 to be rotatable around an axis parallel to the reference line C. The driving side sprocket 43 and the driven side sprocket 44 are connected via a chain (annular member) 59.

The toothed spur wheel 45 has first spur teeth 45a on the outer peripheral surface. The toothed spur wheel 45 is integrally attached to the driven side sprocket 44 via a connection shaft 60 at a position separated from the wheel gear 30. The wheel gear 30 is disposed below the toothed spur wheel 45.

The pinion gear 46 has second spur teeth 46a which engage with both of the first spur teeth 45a of the toothed spur wheel 45 and spur teeth 30a of the wheel gear 30.

The arm member 47 is configured by forming a steel plate in a V-shape when viewed from a side in this example.

The arm member 47 is supported to be rotatable around the connection shaft 60 at the intermediate portion of the arm member 47 in the longitudinal direction thereof. One end portion 47a of the arm member 47 extends downward from the intermediate portion of the arm member 47, and the other end portion 47b of the arm member 47 extends from the intermediate portion of the arm member 47 substantially parallel to the horizontal plane.

The pinion gear 46 is rotatably supported by one end portion 47a of the arm member 47 such that the axis of the pinion gear 46 is parallel to the reference line C.

The second spur teeth 46a of the pinion gear 46 always engage with the first spur teeth 45a of the toothed spur wheel 45.

As illustrated in FIG. 2, a position where the second spur teeth 46a of the pinion gear 46 engage with the spur teeth 30a of the wheel gear 30 by allowing one end portion 47a of the arm member 47 to approach the lower side of the connection shaft 60 is an engagement position P1 of the pinion gear 46. On the other hand, a position to which the pinion gear 46 is moved so as not to engage with the spur teeth 30a of the wheel gear 30 by rotating the arm member 47 around the connection shaft 60 so as to separate one end portion 47a of the arm member 47 from the lower side of the connection shaft 60 (so as to push downward the other end portion 47a of the arm member 47) is a retreat position P2 of the pinion gear 46.

As described above, in the turning device 15 of this embodiment, gears which transmit the driving force to the wheel gear 30 on the downstream side from the driven side sprocket 44 have a two-stage configuration including the toothed spur wheel 45 and the pinion gear 46.

The moving mechanism 48 includes an air cylinder 63 as a power source, a fitting and detaching lever (moving lever) 64 of which one end portion 64a is rotatably supported by the casing 41, and a connection member 65 of which one end portion is rotatably connected to the other end portion 47a of the arm member 47 and of which the other end portion is rotatably connected to the intermediate portion of the fitting and detaching lever 64, in the longitudinal direction thereof.

An inner rod 63a of the air cylinder 63 extends to slide in the vertical direction Z with respect to an outer case 63b. A lower side portion of the inner rod 63a is accommodated in the outer case 63b. The outer case 63b of the air cylinder 63 is supported by the casing 41 via a spring bushing 66.

In the air cylinder 63, the sliding position of the inner rod 63a is displaced according to a control command from the cylinder control unit 54 (see FIG. 4). For example, the cylinder control unit 54 controls the opening and closing of a control valve (not illustrated) to supply and discharge air to and from the outer case 63b, thereby controlling the position of the inner rod 63a in the vertical direction Z.

An upper side portion of the inner rod 63a is rotatably connected to a portion of the fitting and detaching lever 64 closer to the other end portion 64b side than the portion to which the other end portion of the connection member 65 is connected.

In this example, the fitting and detaching lever 64 is formed in a bar shape and is rotated on a plane parallel to the reference plane S.

In the moving mechanism 48 configured as described above, in a case where the inner rod 63a of the air cylinder 63 slides upward with respect to the outer case 63b, the inner rod 63a pushes upward the other end portion 64b side of the fitting and detaching lever 64 such that the fitting and detaching lever 64 is disposed at a position illustrated in FIG. 2 in which the fitting and detaching lever 64 is rotated around one end portion 64a. In this case, the connection member 65 connected to the fitting and detaching lever 64 moves upward and the arm member 47 is rotated around the connection shaft 60 such that the pinion gear 46 is disposed at the engagement position P1 where the pinion gear 46 engages with the wheel gear 30.

On the other hand, in a case where the inner rod 63a slides downward (is lowered) from the state where the pinion gear 46 is disposed at the engagement position P1, the inner rod 63a pulls down the other end portion 64b side of the fitting and detaching lever 64 and the fitting and detaching lever 64 is rotated around one end portion 64a such that the pinion gear 46 is disposed at the retreat position P2 where the pinion gear 46 does not engage with the wheel gear 30.

As described above, the moving mechanism 48 can move the pinion gear 46 between the engagement position P1 and the retreat position P2 according to the control command of the cylinder control unit 54.

The chain cover 49 illustrated in FIGS. 1 to 3 is attachable to and detachable from the casing 41 by the above-mentioned fastening means on one side D1 of the reference plane S. When the chain cover 49 is attached to the casing 41, the chain cover 49 covers the driving side sprocket 43. The chain cover 49 is used to prevent an operator or the like from coming into contact with the driving side sprocket 43 or the chain 59.

As illustrated in FIG. 1, the above-mentioned compressor 69 is connected to the rotor 14 on the other side D2 of the reference plane S. In order to cover the connection portion of the rotor 14 and the compressor 69, a cylindrical coupling guard 70 is detachably attached.

Next, an operation of the above-described turning device 15, and particularly, an operation of the steam turbine 1 immediately after the stop of the operation will be described.

First, during the operation of the steam turbine 1, the control unit 52 of the turning device 15 allows the inner rod 63a of the air cylinder 63 to be held at a position where the inner rod 63a is lowered to the outer case 63b. At this time, the driving motor 42 is in a stopped state, and the pinion gear 46 is disposed at the retreat position P2.

Thereafter, when the control unit 52 receives a signal indicating that the operation of the steam turbine 1 is stopped from the outside, first, the control unit 52 allows the inner rod 63a of the air cylinder 63 to slide upward via the cylinder control unit 54. Therefore, the arm member 47 is rotated around the connection shaft 60 via the fitting and detaching lever 64 and the connection member 65 and the pinion gear 46 is moved from the retreat position P2 to the engagement position P1.

When the pinion gear 46 engages with the wheel gear 30, the driving of the driving motor 42 is started. Accordingly, the rotation power of the driving motor 42 is transmitted to the wheel gear 30 via the deceleration mechanism 58, the sprockets 43 and 44, the chain 59, the toothed spur wheel 45, and the pinion gear 46. In addition, the rotor 14 is rotated along with the wheel gear 30. At this time, the rotor 14 is rotated at a lower speed than when the steam turbine 1 is operated.

The coupling guard 70 may be removed during the maintenance, inspection, or the like of the compressor 69. Even in this case, since the coupling guard 70 is attached on the other side D2 of the reference plane S and the chain cover 49 is attached on one side D1 of the reference plane S, the chain cover 49 does not cause inconvenience during the attachment and detachment of the coupling guard 70.

In addition, when the control unit 52 is not operated or the like, by raising or lowering the other end portion 64b side of the fitting and detaching lever 64 by the operator, the position of the pinion gear 46 can be manually controlled to be the engagement position P1 or the retreat position P2.

As described above, in the turning device 15 of this embodiment and the steam turbine 1, since the compressor 69 is connected to the rotor 14 on the other side D2 of the reference plane S, the coupling guard 70 is attached to the connection portion of the rotor 14 and the compressor 69. Even in this case, since the chain cover 49 is attached on one side D1 of the reference plane S, the interference of the coupling guard 70 with the chain cover 49 during attachment and detachment can be prevented.

Since the gears which transmit the driving force of the driving motor 42 have the two-stage configuration including the toothed spur wheel 45 and the pinion gear 46, compared to the case of the three-stage configuration of the gears according to the related art, the number of components is reduced, rigidity is increased, and a reduction in the size can be achieved by suppressing the length of the turning device 15 in the vertical direction Z. The transmission efficiency of the driving force of the driving motor 42 can be enhanced.

(Second Embodiment)

Next, a second embodiment of the present invention will be described with reference to FIGS. 5 and 6. Like elements similar to those of the above-described embodiment are denoted by like reference numerals, the description thereof will not be repeated, and only differences will be described.

Figure 5:
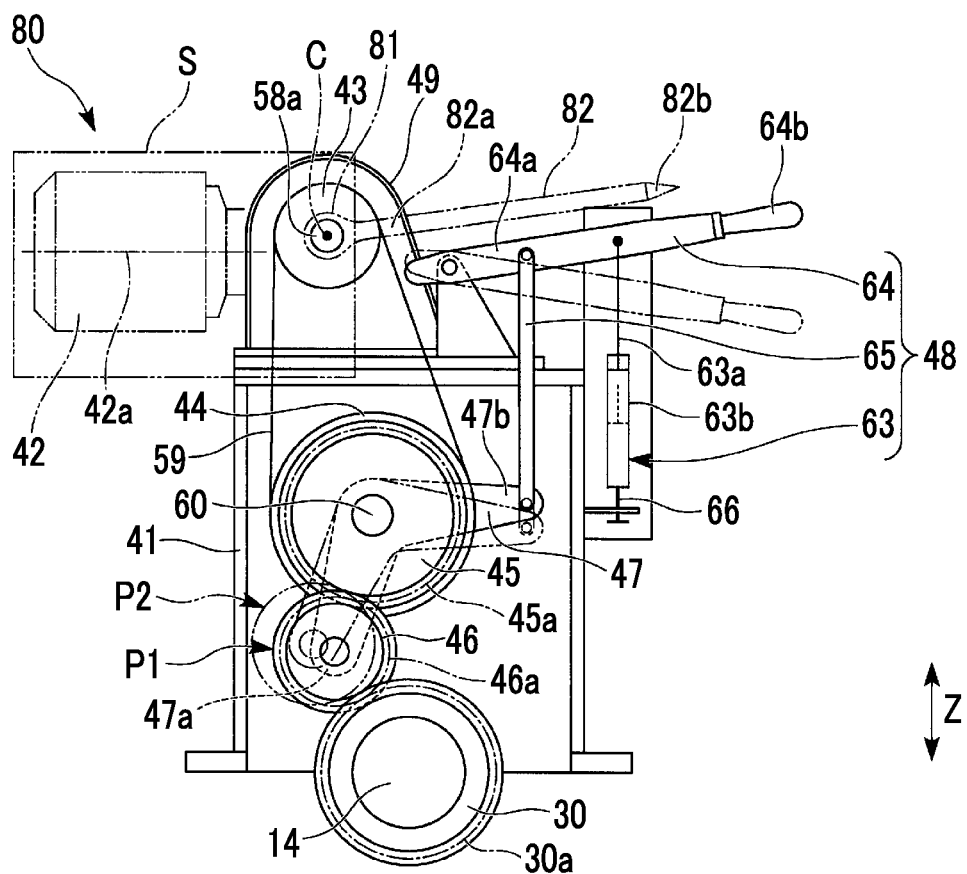
FIG. 5 is a sectional view of a side of a turning device of a second embodiment of the present invention.
Figure 6:
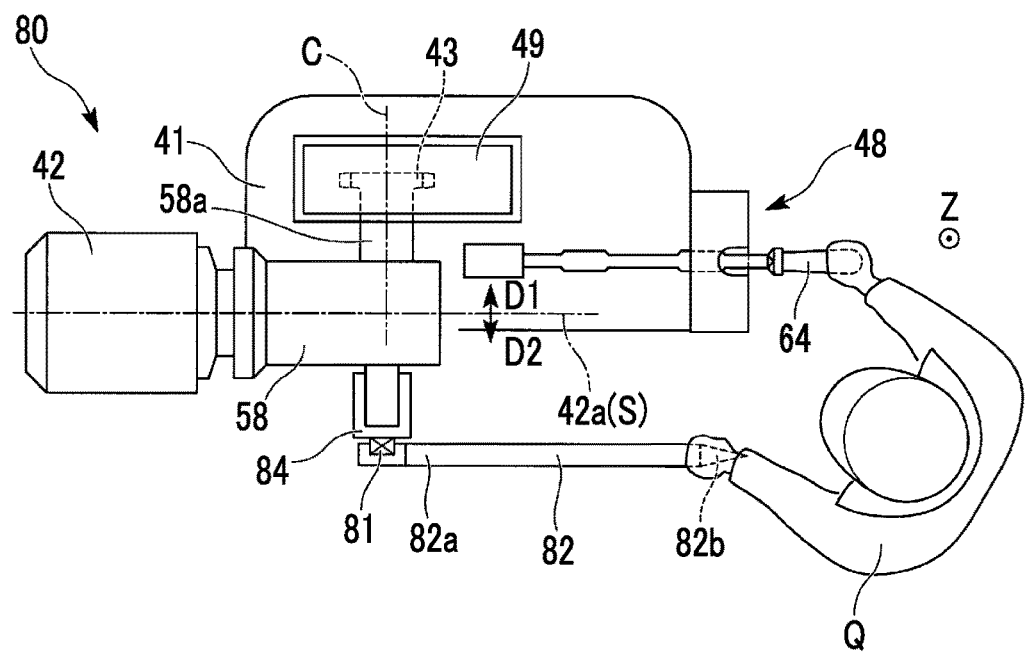
FIG. 6 is a partially cutaway plan view of the turning device.

As illustrated in FIGS. 5 and 6, a turning device 80 of this embodiment further includes, in addition to each configuration of the turning device 15 of the first embodiment, a rotating lever 82 of which one end portion 82a is coaxially connected to the driving side sprocket 43 via a ratchet mechanism 81.

In addition, although the ratchet mechanism 81 and the rotating lever 82 are not illustrated in the section of FIG. 5, the ratchet mechanism 81 and the rotating lever 82 are illustrated by two-dot chain lines for convenience of description.

The ratchet mechanism 81 is not illustrated in detail and has a well-known configuration. The ratchet mechanism 81 is attached to the end portion of the connection shaft 58a on the opposite side of the driving side sprocket 43, that is, the end portion on the other side D2 of the reference plane S via a spacer 84.

The ratchet mechanism 81 restricts the rotation of one end portion 82a of the rotating lever 82 in one direction around the reference line C with respect to the reference line C which is the axis of the driving side sprocket 43, that is, the spacer 84, while allowing the rotation in the other direction around the reference line C. That is, by rotating the other end portion 82b of the rotating lever 82 around the reference line C to reciprocate several times in one direction, the other direction, one direction, and the like, the driving side sprocket 43 can be rotated in only one direction around the reference line C. Accordingly, the rotation of the driving side sprocket 43 is transmitted and the rotor 14 is rotated to match the phase of the rotor 14.

In this example, the rotating lever 82 is formed in a bar shape and is rotated on a plane parallel to the reference plane S.

The rotating lever 82 and the above-mentioned fitting and detaching lever 64 are rotated in a direction along the reference line C on the same side with respect to the chain cover 49.

In the turning device 80 configured as described above, when the operation of the steam turbine is stopped and the control unit 52 is not operated or the like, an operator Q can operate the rotating lever 82 to rotate the rotor 14 or can operate the fitting and detaching lever 64 to control the position of the pinion gear 46.

As described above, according to the turning device 80 of this embodiment, the coupling guard 70 is prevented from interfering with the chain cover 49 when the coupling guard 70 is attached and detached.

Since the rotating lever 82 and the fitting and detaching lever 64 are rotated in the direction along the reference line C on the same side with respect to the chain cover 49, one operator Q can easily operate both the levers 64 and 82 on one side of the turning device 80 without the interruption of the chain cover 49.

While the first and second embodiments of the present invention have been described in detail with reference to the drawings, the specific configurations are not limited to the embodiments, and include changes, combinations, omissions, and the like of the configurations without departing from the gist of the present invention. Furthermore, it is needless to say that the configurations described in each of the embodiments can be appropriately combined for use.

For example, in the first and second embodiments, a driving wheel is the driving side sprocket 43, a driven wheel is the driven side sprocket 44, and an annular member is the chain 59. However, a configuration in which the driving wheel is a driving pulley, the driven wheel is a driven pulley, and the annular member is a V-belt looped over both the pulleys may also be employed.

In the description, the rotary machine is the steam turbine. However, the rotary machine is not limited thereto and may also be a gas turbine or the like.

INDUSTRIAL APPLICABILITY

The present invention can be applied to a turning device for rotating a rotor at a low speed.

REFERENCE SIGNS LIST

1 steam turbine (rotary machine)
14 rotor (rotary shaft)
15, 80 turning device
30 wheel gear
41 casing
42 driving motor
42a driving shaft
43 driving side sprocket (driving wheel)
44 driven side sprocket (driven wheel)
45 toothed spur wheel (first toothed wheel)
45a first spur teeth
46 pinion gear (second toothed wheel)
46a second spur teeth
47 arm member
48 moving mechanism
49 chain cover (cover)
59 chain (annular member)
64 fitting and detaching lever (moving lever)
65 connection member
69 compressor
81 ratchet mechanism
82 rotating lever
82a one end portion
C reference line
D1 one side
D2 the other side
P1 engagement position
P2 retreat position
S reference plane
Z vertical direction

The invention claimed is:
1. A turning device comprising:
a casing;
a driving motor which is attached to be positioned higher than the casing;
a driving wheel which is disposed above the casing, is supported on one side with respect to a reference plane that is parallel to a vertical direction on a driving shaft of the driving motor and, to be rotatable around a reference line that intersects the reference plane, and is rotated by the driving motor;
a driven wheel which is disposed in the casing, is supported to be rotatable around an axis that is parallel to the reference line, and is connected to the driving wheel via an annular member;
a first toothed wheel which is coaxially connected to the driven wheel and has first spur teeth;
a second toothed wheel having second spur teeth that engage with each of a wheel gear that is provided coaxially with a rotary shaft which extends parallel to the reference line, and the first spur teeth of the first toothed wheel;
an arm member which rotatably supports the second toothed wheel;
a moving mechanism which moves the second toothed wheel between an engagement position where the second toothed wheel engages with the wheel gear and a retreat position where the second toothed wheel does not engage with the wheel gear, by moving the arm member;
a cover which is attachable to and detachable from the casing and covers the driving wheel; and
a rotating lever of which one end portion is coaxially connected to the driving wheel via a ratchet mechanism,
wherein a compressor is connected to the rotary shaft on the other side with respect to the reference plane,
wherein the ratchet mechanism restricts rotation of one end portion of the rotating lever, with respect to an axis of the driving wheel, in one direction around the axis, while allowing the rotation thereof in the other direction around the axis,
the moving mechanism includes
a moving lever of which one end portion is rotatably supported by the casing, and
a connection member which is connected to each of the moving lever and the arm member and is configured to move the arm member when the moving lever is rotated, and the rotating lever and the moving lever are rotated in a direction along the reference line on the same side with respect to the cover.

2. A rotary machine comprising:

a turning device, wherein the turning device comprising:

a casing;

a driving motor which is attached to be positioned higher than the casing;

a driving wheel which is disposed above the casing, the driving wheel being supported on one side with respect to a reference plane that is parallel to a vertical direction on a driving shaft of the driving motor and, to be rotatable around a reference line that intersects the reference plane, and is rotated by the driving motor;

a driven wheel which is disposed in the casing, is supported to be rotatable around an axis that is parallel to the reference line, and is connected to the driving, wheel via an annular member;

a first toothed wheel which is coaxially connected to the driven wheel and has first spur teeth;

a second toothed wheel having second spur teeth that engage with each of a wheel gear that is provided coaxially with a rotary shaft which extends parallel to the reference line, and the first spur teeth of the first toothed wheel;

an arm member which rotatably supports the second toothed wheel;

a moving mechanism which moves the second toothed wheel between an engagement position where the second toothed wheel engages with the wheel gear and a retreat position where the second toothed wheel does not engage with the wheel gear, by moving the arm member; and a cover which s attachable to and detachable from the casing and covers the driving wheel,; and a rotating lever of which one end portion is coaxially connected to the driving wheel via a ratchet mechanism, wherein a compressor is connected to the rotary shaft on the other side with respect to the reference plane, wherein the ratchet mechanism restricts rotation of one end portion of the rotating lever, with respect to an axis of the driving wheel, in one direction around the axis, while allowing the rotation thereof in the other direction around the axis, the moving mechanism includes a moving lever of which one end portion is rotatably supported by the casing, and a connection member which is connected to each of the moving lever and the arm member and is configured to move the arm member when the moving lever is rotated, and the rotating lever and the moving lever are rotated in a direction along the reference line on the same side with respect to the cover.

\* \* \* \* \*